United States Patent [19]

Osaka et al.

[11] 4,070,439
[45] Jan. 24, 1978

[54] PROCESS FOR THE RECOVERY OF ANTIMONY PENTACHLORIDE FROM A SPENT ANTIMONY CATALYST MIXTURE

[75] Inventors: Yonosuke Osaka, Takatsuki; Takashi Tohzuka, Settsu, both of Japan

[73] Assignee: Daikin Kogyo Co., Ltd., Osaka, Japan

[21] Appl. No.: 711,222

[22] Filed: Aug. 3, 1976

[30] Foreign Application Priority Data

Aug. 13, 1975  Japan .................................. 50-98684

[51] Int. Cl.$^2$ ............................................. C01B 29/00
[52] U.S. Cl. ........................................ 423/88; 252/415
[58] Field of Search .................... 423/87, 88, 491; 252/415

[56] References Cited

U.S. PATENT DOCUMENTS

| | | | |
|---|---|---|---|
| 3,760,059 | 9/1973 | Ertel et al. ............................. | 423/87 |
| 3,767,566 | 10/1973 | Cartmell ................................ | 208/120 |
| 3,784,671 | 1/1974 | Joerchel et al. ...................... | 423/88 |
| 3,888,762 | 6/1975 | Gerhold ............................... | 208/120 |
| 4,005,176 | 1/1977 | Fernschild et al. ................... | 423/87 |

*Primary Examiner*—O. R. Vertiz
*Assistant Examiner*—Wayne A. Langel
*Attorney, Agent, or Firm*—Lane, Aitken, Dunner & Ziems

[57] ABSTRACT

Antimony pentachloride is recovered from a spent antimony catalyst mixture in a simple manner by bubbling through the spent catalyst mixture an inactive gas such as trichlorotrifluoroethane at an elevated temperature to convert and to remove high melting point or high sublimating point substances as lower boiling point substances; converting fluorinated antimony into chlorinated antimony by means of a chlorinating agent such as carbon tetrachloride; converting antimony (III) into antimony (V) by oxidation with chlorine; and recovering antimony pentachloride by distillation. The antimony pentachloride thus recovered may readily be used as a catalyst for fluorination of a chlorinated hydrocarbon by reaction with hydrogen fluoride.

21 Claims, No Drawings

PROCESS FOR THE RECOVERY OF ANTIMONY PENTACHLORIDE FROM A SPENT ANTIMONY CATALYST MIXTURE

BACKGROUND OF THE INVENTION

This invention relates to the recovery of antimony in the form of antimony pentachloride from a spent antimony halides catalyst mixture, and more particularly to a process for the recovery of antimony pentachloride, which may readily be reused as a catalyst for the fluorination of chlorinated hydrocarbons, from an antimony catalyst mixture used for the fluorination of chlorinated hydrocarbons.

Antimony pentachloride serves as a catalyst for the fluorination, with hydrogen fluoride, of chlorinated hydrocarbons including, for example, carbon tetrachloride, tetrachloroethylene, chloroform, trichloroethylene and the like. Fluorinated chlorohydrocarbons are widely used as solvents, refrigerants and propellants in the aerosols industries. Such an antimony catalyst is generally in the form of liquid and contains partly-fluorinated antimony and trivalent antimony. In the fluorination process, the liquid antimony catalyst is charged into a reaction vessel wherein it acts on chlorinated hydrocarbons and hydrogen fluoride introduced therein to promote the fluorination of the chlorinated hydrocarbons. During the course of employment over a long period of time, however, various impurities or other substances are accumulated in the liquid catalyst, including small amounts of impurities introduced with the chlorinated hydrocarbons such as chlorohydrocarbons, water and the like; small amounts of high boiling point or high sublimating point chloro- or chlorofluoro-hydrocarbons secondarily produced during the contact reaction; and inorganic metal salts such as of nickel, chromium iron, and the like, the metals being mainly derived from the materials of the reaction vessel. This lowers the catalytic activity and renewal of catalyst becomes necessary when its activity has become too low. The spent antimony catalyst mixture mainly composed of antimony compounds is generally passed to waste disposal at some cost. As a matter of fact, recovery of useful substances from the spent antimony catalyst mixture is desirable and advantageous from a standpoint of prevention of environmental pollution and protection of natural resources and as well as from an economic viewpoint.

The spent antimony catalyst mixture comprises pentavalent antimony halides as its primal components but antimony is also present in the form of trivalent compounds. (It is said that the pentavalent antimony halides are present either in the form of a mixture of $SbCl_5$ and $SbF_5$ or in the form of a mixture of partly-fluorinated antimony chlorides as expressed by the formula $SbCl_xF_y$ where $x + y = 5$) Of these, certain antimony halides having high melting points such as $SbCl_3$ (m.p. 73° C), $SbCl_4F$ (m.p. 75° C) and $SbCl_{3.7}F_{1.3}$ (m.p. 79° C) have a tendency to block up distillation apparatus. In addition, the spent catalyst mixture also contains salts of nickel, chromium, iron, etc., sublimate substances with high sublimation points or high melting point substances such as hexachloroethane (sublimation point 185° C), pentachlorofluoroethane (m.p. 100° C) and the like (which also tend to block up distillation apparatus), or small amounts of the starting materials for the fluorination reaction and the reaction products. Accordingly, it is very difficult to recover useful substances, particularly antimony pentachloride, from the used antimony catalyst for reuse as catalyst. Antimony pentachloride can be usually readily isolated by distillation if not contained in a complicated mixture. When antimony pentachloride is present in a composition containing a variety of substances such as indicated above, the isolation of antimony pentachloride by mere distillation is extremely difficult due to the adverse effect of substances which block up the distillation apparatus.

Several processes for the recovery of antimony pentachloride from spent antimony catalyst mixtures have been heretofore proposed. For example, in U.S. Pat. No. 3,760,059, there is disclosed a process wherein a spent antimony catalyst mixture is mixed with trichloroethylene and heated to reduce all of the antimony compounds contained in the catalyst mixture into antimony trichloride, and the antimony trichloride is then crystallized in organic solution and separated, followed by coversion to antimony pentachloride by oxidation. However, this process undesirably involves offsetting steps to be diserably omitted if possible, such as the reduction of antimony compounds into the trivalent antimony compound and the oxidation of the antimony trichloride into antimony pentachloride, and also involves the steps of the crystallization and separation of antimony trichloride which are complicated and result in a relatively great loss.

The process of U.S. Pat. No. 3,784,671 comprises the steps of: (a) heating a spent antimony catalyst mixture to convert antimony fluorides contained therein to corresponding antimony chlorides and distilling off halogenated hydrocarbons for concentration; (b) thermally decomposing antimony pentachloride into antimony trichloride and chlorine; (c) separating organic impurities in the mixture by extraction with a halogenated hydrocarbon; (d) subjecting the antimony trichloride-containing residue to reaction with chlorine to form antimony pentachloride; and (e) recovering the thus formed antimony pentachloride by vacuum distillation. Though the above process represent an improvement in that the chlorine generated upon the thermal decomposition is recycled in the subsequent chlorination step without suffering a loss of the chlorine, it also involves offsetting steps of removing chlorine from antimony pentachloride to yield antimony trichloride and of subjecting the trichloride to oxidation reaction with chlorine to give antimony pentachloride. In addition thereto, the process requires such a complicated solid-liquid separation step wherein organic impurities are separated from antimony trichloride by dissolving them in a halogenated hydrocarbon.

BRIEF SUMMARY OF THE INVENTION

Accordingly, it is an object of the present invention to provide a process for the recovery of pure antimony pentachloride, which can readily be reused as catalyst for fluorination of chlorinated hydrocarbons, from a spent antimony halide catalyst mixture.

Another object of the present invention is to provide a simple process for recovering antimony pentachloride from a spent antimony catalyst mixture which does not require a double operation of oxidation and reduction nor a complicated solid-liquid separation.

A further object of the present invention is to provide a recovery process wherein substances other than antimony pentachloride can be recovered and can be effectively utilized.

In accomplishing the foregoing objects, the present invention provide a process for the recovery of antimony pentachloride from a spent antimony halide catalyst mixture comprising antimony (III) and antimony (V) halides and chloro- or chlorofluorohydrocarbons having high melting points or high sublimation points, the process including the steps of:

a. bubbling an inactive gas through the spent catalyst mixture at a temperature sufficient to convert the high melting point or high sublimation point chloro- or chlorofluorohydrocarbons into lower boiling point chlorofluorohydrocarbons so as to expell the lower boiling point chlorofluorohydrocarbons thus produced and originally contained, if any, in the spent catalyst mixture together with said inactive gas;

b. adding to the remaining catalyst mixture a chlorinating agent to covert antimony fluorides into antimony chlorides and converting trivalent antimony into pentavalent antimony by means of chlorine; and c. recovering antimony pentachloride by distillation.

Other objects, features and advantages of this invention will become more apparent from the detailed description to follow.

DESCRIPTION OF THE PREFERRED EMBODIMENTS

The spent antimony halides catalyst mixture to be treated in accordance with the process of the invention may contain as its main component pentavalent and/or trivalent antimony chlorides and/or fluorides. The catalyst composition further contains sublimate substances with high sublimation points or high melting point substances, such as hexachloroethane, pentachlorofluoroethane, etc., and metal salts such as of nickel, chromium, iron, etc., and/or tarry substances.

In particular, the process of the invention is most suitable in treating a spent antimony catalyst mixture which has been employed in a process for the fluorination of a chlorinated hydrocarbon having 1 - 2 carbon atoms such as carbon tetrachloride, chloroform, tetrachloroethylene, trichloroethylene or the like, by reaction with hydrogen fluoride.

The preferred sepnt antimony catalyst mixture generally comprises, in addition to compounds incapable of chemical identification such as tarry substances (generally contained in amounts less than 10% by weight) and metal salts such as of nickel, chromium, iron, etc., 10 - 10 mol % of antimony halides, 90 - 10 mol % of halogenated hydrocarbons, of which hexachloroethane is in a amount of 0.5 - 10 mol % and pentachloroethane in an amount of 5 - 50 mol %. The metal salts are present in an amount of 0 - 0.005 moles per mole of the antimony halides. (The term halide used herein is intended to mean chloride or fluoride). It should be noted that the catalyst mixture to be treated by the process of the invention is not limited to the above numerical ranges, but rather these composition ranges may vary depending on the capacity of apparatus used, desired purity of recovered substances and economy.

In the first step of the process of the invention, the spent antimony catalyst mixture is treated by bubbling through or feeding into the catalyst mixture an inactive gas at an elevated temperature. As a result, lower boiling point chlorofluorohydrocarbons thereby produced and, if any, originally contained in the catalyst mixture are distilled off together with the inactive gas. It is preferred that the treatment temperature be between 80° and 140° C, more preferably between 100° and 130° C. At a temperature lower than 80° C, conversion of high melting point or high sublimation point chloro- or chlorofluorohydrocarbons into the lower boiling point chlorofluorohydrocarbons is slower. Temperatures above 140° C may induce a decomposition of antimony pentachloride into antimony trichloride, causing a loss of chlorine.

The first step of the process of the present invention may be conducted under any suitable pressure. Generally the bubbling step is carried out under a pressure of between 0.5 and 5 atmosphere (absolute). Practically, it is sufficient to conduct the first step in the vicinity of atmospheric pressure.

The inactive gas is suitably fed in an amount of between about 2 l/hr. and 200 l/hr., preferably between about 4 l/hr. and 100 l/hr. per 1 kg of the spent antimony catalyst mixture.

The inactive gas herein used is understood to be a substance which is in a gaseous form at a temperature of 80° to 140° C and which is completely inert to or virtually does not react with fluorinated antimony. Examples of the former inactive substances include helium, argon, nitrogen, carbon dioxide, sulfuryl fluoride ($SO_2F_2$), and the like. While, the latter substances are those which are less reactive than hexachloroethane and pentachlorofluoroethane with fluorinated antimony and hence virtually do not react with fluorinated antimony. Examples of such substances include trichlorotrifluoroethane, dichlorotetrafluoroethane, chloropentafluoroethane, dichloromethane, monochloromethane, dichlorotrifluoroethane, chlorotrifluoroethane, dichlorodifluoroethane, chlorodifluoromethane, trifluoromethane, chlorotrifluoromethane, dichlorodifluoromethane, nitrogen trifluoride, perfluoroethyl ether, and the like.

Of these, substances having a boiling point higher than about −50° C (minus) are preferred, since they can easily be condensed and can be reused or recycled. Trichlorotrifluoroethane, dichloromethane and dichlorotrifluoroethane are most preferable since they can be readily condensed and collected by cooling with water under atmospheric pressure together with the lower boiling point colorofluorohydrocarbons expelled in this step. After the removal of the chlorofluorohydrocarbons by fractional distillation, such inactive gases can again be recycled to the first step. Thus, the use of trichlorotrifluoroethane, dichloromethane and dichlorotrifluoroethane are advantageous in that the inactive gas can be confined within the closed system.

With the use of certain other inactive gases having considerably lower boiling points than tetrachlorodifluoroethane, however, it is possible to recover them for recycling, since the chlorofluorohydrocarbons distilled off together with the inactive gas are composed mainly of tetrachlorodifluoroethane which is readily condensed and is isolated therefrom by cooling with water. Thus, it is desired to select the inactive gas according to the amount and kind of the spent antimony catalyst mixture and as well as the type of the apparatus employed for the recovery process.

Tetrachloromethane, trichloromethane and 1,1,1-trichloroethane are not suited for use as the inactive gas in the first step, since they are more reactive than hexachloroethane and pentachlorofluoroethane with fluorinated antimony. Most hydrocarbons, heteroalicyclic compounds, heteroaromatic compounds, alcohols, ethers, organic acids, amines, nitro compounds, nitroso compounds, ketones, aldehydes, esters and organic acid derivatives as well as water are not suitably used as the inactive gas, since they generally react with antimony halides, causing inactivation of the antimony catalyst. Further, it is better not to use hydrocarbons or halogenated hydrocarbons having double or triple bonds, since they tend to reduce pentavalent antimony to trivalent antimony. Tetrachlorodifluoroethane is one of the substances to be removed from the system in the first step and, hence, is not suitably used as the inactive gas.

A small amount of antimony halides may sometimes be entrained together with the lower boiling point chlorfluorohydrocarbons in the inactive gas discharged during the first bubbling step. The discharged antimony halides can be trapped by suitable means and, after removal of certain organic compounds contained therein, can be again introduced into the system or readily used as catalyst.

The first step plays an important role of the process of the present invention. That is, the present invention is based on the finding that when an inactive gas is bubbled through a spent antimony catalyst mixture at a temperature of between about 80° and 140° C, chlorofluorohydrocarbons with low boiling points are selectively expelled without use of distillation columns by distillation or vacuum distillation and, in addition, conversion of blocking-up materials such as hexachloroethane into lower boiling point chlorofluorohydrocarbons is accelerated. Furthermore, it has been found that even if antimony compounds such as $SbCl_3$, $SbCl_4F$, $SbCl_{3.7}F_{1.3}$ and the like are vaporized and entrained in the expelled materials, no blockage occurs within the piper through which the expelled materials pass, since the stream of the inactive gas prevents the condensates or solid deposits of such antimony compounds from adhering to the wall of the pipe. Trichlorotrifluoroethane, dichloromethane and dichlorotrifluoroethane have been found most advantageous because they completely wash out solidified antimony compounds, even if deposits thereof should form.

Thus, the feeding of the inactive gas into the spent antimony halide catalyst mixture at an elevated temperature serves both to convert hexachloroethane and pentachlorofluoroethane into lower boiling point chlorofluorohydrocarbons and to expell the lower boiling point chlorofluorohydrocarbons thus formed and, if any, originally contained in the spent catalyst mixture without blockage of the apparatus.

It is necessary that at least some fluorine bonded to antimony be present in the first step. It is preferred that the content of fluorine bonded to antimony per gram atom of total antimony in the spent catalyst mixture be at least 0.2 gram atoms. With a content of bound fluorine smaller than the above defined range, the sublimate substances with high sublimation points and high melting point substances can not be satisfactorily converted to low boiling point substances, or it takes along period of conversion time because of lower conversion rate. Preferably, the fluorine content per gram atom of total antimony is in the range of 1.5 to 0.3 gram atoms. Where the fluorine content is not sufficient, however, hydrogen fluoride may be advantageously added to the reaction system prior to or during the first step so as to convert antimony chlorides to fluorides. In this case, though the amount of fluorine in the reaction system is not critically limited, an unnecessary excess is unfavorable since the process of the present invention involves substitution with chlorine in a subsequent step.

Also, it is necessary that at least some of pentavalent antimony be present during the first step. It is preferred that the pentavalent antimony be present in an amount at least 40%, more preferably at least 60%, based on the total weight of antimony. With the pentavalent antimony content less than 40%, trivalent antimony may be precipitated in the neighbourhood of 80° C. When the amount of pentavalent antimony is insufficient, however, it will suffice to add chlorine gas to the catalyst mixture so that part of trivalent antimony is converted to pentavalent antimony so as to attain the above-defined range. The maximum amount of pentavalent antimony is not specifically limited. It is not necessary, however, to convert all the trivalent antimony to pentavalent antimony. Presence of a small amount of trivalent antimony is desirable, since the trivalent antimony serves as a promoter for conversion of undesirable compounds such as hexachloroethane into the lower boiling point compounds. Preferably, the content of pentavalent antimony is not greater than 97% based on the total weight of antimony.

Though it is ideal to continue the bubbling of an inactive gas until neither hexachloroethane nor pentachlorofluoroethane can be detected in the catalyst mixture, presences of less than 0.02 moles for pentachlorofluoroethane and less than 0.005 moles for hexachloroethane both per gram atom of antimony will suffice from an industrial point of view. However, these values should not be construed as limiting in the process of the invention but may vary depending on the ability and operating time of the apparatus employed in subsequent steps, and economy. In short, the sublimate substances with high sublimation points or high melting point substances such as hexachloroethane, pentachlorofluoroethane and the like should be removed in the first step to such an extent that no blockage of apparatus and pipes occurs in the subsequent reaction, distillation and transferring operations.

The spent catalyst mixture may further contain chlorinated hydrocarbons used as starting material for the fluorination reaction and fluorochlorohydrocarbons produced by that reaction. The presence of the chlorinated hydrocarbons starting materials and the fluorochlorohydrocarbon products does not adversely affect the process of the invention. Preferably, these chlorinated hydrocarbons and fluorochlorohydrocarbons are distilled off, prior to the first step of the process of the invention, by heating the spent antimony catalyst mixture under atmospheric pressure at a temperature of 80° to 140° C.

The antimony catalyst mixture remaining after the first step is mixed with a chlorinating agent to convert the antimony fluorides into antimony chlorides, and with elemental chlorine to convert trivalent antimony to pentavalent antimony. The sequence of addition of the chlorinating agent and the chlorine is not critical. The chlorinating agent and chlorine can also be added simultaneously. In this regard, since antimony pentachloride tends to be slightly decomposed into antimony trichloride and chlorine during the treatment with the chlorinating agent, it is preferred to add chlorine after or simultaneous with the addition of the chlorinating agent.

The chlorinating agent is a compound capable of substituting chlorine for the fluorine of the antimony fluorides and may be carbon tetrachloride, chloroform, trichlorofluoromethane, boron trichloride, etc. Of these, carbon tetrachloride and chloroform are preferred since they are converted to a gas capable of being readily condensed under ordinarily employed refrigerating temperature conditions, rendering them easy to handle after discharge.

As to the amount of the chlorinating agent, one mol of carbon tetrachloride or chloroform serves to substitute about 2 gram atoms of fluorine bonded to antimony with chlorine. Accordingly, carbon tetrachloride or chloroform is added at least in the above ratio, preferably 2 – 5 times as great as that ratio. On the other hand, 1 mol of trichlorofluoromethane serves to substitute about 1 gram atom of fluorine of antimony fluoride with chlorine. Trichlorofluoromethane is added at least in the above ratio, preferably 2 – 5 times as great as that ratio.

The temperature of the chlorination reaction of antimony fluoride with the chlorinating agent is generally in the range of 40° to 140° C, preferably 60° to 120° C. With a temperature below 40° C, it takes a long period of time for the reaction. A temperature above 140° C results in a loss of chlorine due to a vigorous decomposition of antimony pentachloride.

The reaction pressure is not critical. It is generally 0.5 – 8 atms./abs., and for practicality may be in the vicinity of atmospheric pressure. Particularly when a chlorinated hydrocarbon is selected as the chlorinating agent, it is better to choose the pressure whereat the chlorinating agent can be refluxed at a water cooling temperature.

During chlorination reaction, the agitation may be conducted if necessary.

In the oxidation of antimony by reaction with chlorine, it is sufficient to add chlorine to the antimony catalyst mixture in the stoichiometric amount in relation to the trivalent antimony. If desired, excess chlorine may be added. The oxidation reaction may be carried out at a temperature of between 20° and 120° C, preferably between 20° and 80° C. The reaction pressure is generally in the range of 0.5 to 3 atms. (absolute) but this range is not critical. Practically, the oxidation reaction may be conducted in the vicinity of atmospheric pressure. During the oxidation reaction, agitation may be conducted, if necessary.

The antimony catalyst mixture treated in the above-described second step is finally subjected to distillation to distil off antimony pentachloride. The catalyst mixture may first be treated by simple distillation at 100° to 130° C at atmospheric pressure to distil off the remaining chlorinating agent and the substances converted from the chlorination agent, and also chlorine, as the case may be. Then, recovery of antimony pentachloride contained in the mixture is effected by distillation under a reduced pressure. During the vacuum distillation, the oven temperature should not be increased to temperatures above 140° C since decomposition of antimony pentachloride would take place. Therefore, the distillation is carried out at a temperature lower than 140° C, preferably 80° to 130° C. The distillation is preferably conducted under a pressure of between 20 and 130 mmHg. In order to prevent the decomposition of antimony pentachloride into antimony trichloride and chlorine, it is advantageous to conduct the distillation of antimony pentachloride in a chlorine gas atmosphere.

The following examples serve to further illustrate the present invention.

EXAMPLE 1

5.75 kg of a used antimony catalyst mixture was introduced into a 5 l nickel vessel and heated to 120° C to remove low boiling point substances at atmospheric pressure, thereby obtaining 5.58 kg of a spent antimony catalyst mixture, the composition of which is shown in Table 1.1. Antimony pentachloride was recovered from the spent antimony catalyst mixture.

Table 1.1

| Composition of Spent Antimony Catalyst Mixture | | |
|---|---|---|
| Components | Weight Compositon (kg) | Molar Composition (mol) |
| Antimony chlorides and antimony fluorides (weight ratio of Sb(III)/total Sb = 0.207 and atomic ratio of F/total Sb = 0.57) | 3.81 | 13.8 |
| $C_2$-halogenated hydrocarbons | | |
| $C_2Cl_6$ | 0.14 | 0.58 |
| $C_2Cl_5F$ | 0.67 | 3.03 |
| others | 0.77 | 3.87 |
| Other substances (inorganic salts other than those of Sb, tars, etc.) | 0.19 | — |
| Total | 5.58 | — |

Then, trichlorotrifluoroethane was bubbled through the spent antimony catalyst mixture with the above composition, first at 120° C under atmospheric pressure for 8 hours at a rate of 200 g/hr. and then at 130° C under the same pressure for 34 hours at a rate of 300 g/hr. The discharged gas was recovered by a water cooled trap. As a result, the materials entrained in and discharged with the trichlorotrifluoroethane had the composition as shown in Table 1.2. While, the residue in the reaction vessel had a composition as shown in Table 1.3.

Table 1.2

| Discharged Materials Entrained in Trichlorotrifluoroethane | | |
|---|---|---|
| Components | Weight Composition (kg) | Molar Composition (mol) |
| Antimony chlorides and antimony fluorides (weight ratio Sb(III)/total Sb = 0.040 and atomic ratio of F/total Sb = 0.28) | 0.42 | 1.45 |
| $C_2Cl_6$ | 0.00 | 0.00 |
| $C_2Cl_5F$ | 0.17 | 0.79 |
| $C_2Cl_4F_2$ | 0.62 | 3.04 |

Table 1.3

| Composition of Residue Obtained after Bubbling of Trichlorotrifluoroethane | | |
|---|---|---|
| Components | Weight Composition (kg) | Molar Composition (mol) |
| Antimony chlorides and antimony fluorides (weight ratio of Sb (III)/total Sb = 0.252 and atomic ratio of F/total Sb = 0.34) | 3.38 | 12.35 |
| $C_2$-halogenated hydrocarbons | | |
| $C_2Cl_6$ | 0.01 | 0.04 |
| $C_2Cl_5F$ | 0.04 | 0.16 |
| others | 0.22 | 0.38 |
| Other Substances (inorganic salts other than those of Sb, tars, etc.) | 0.19 | — |
| Total | 3.84 | — |

The residue was mixed with 1500 ml of carbon tetrachloride, followed by refluxing at 100° C for 5 hours (the temperature the reflux condenser was 25° C). The gas discharged from the top of the condenser amounted to 250 g, with a composition of, by weight, 9.2% of carbon tetrachloride, 77% of trichlorofluoromethane, 10.6% of dichlorodifluoromethane and 3.2% of phosgene. After cooling, 256 g of chlorine gas was added to the catalyst mixture at 25° C, followed by single-stage distillation at 130° C under atmospheric pressure so as to expel carbon tetrachloride and the chlorinated hydrocarbons produced from carbon tetrachloride, thereby obtaining a distillate (hereinlater referred to as "first fraction"). Antimony pentachloride was successively distilled off at 90° C under 20 mmHg and the distillate was collected in a series of a water-cooled trap and an acetone-dry ice-cooled trap (hereinlater referred to as second fraction and third fraction, respectively). The results are as shown in Table 1.4 below. The recovery percentage of antimony in the second fraction was 80.5%, with a purity of 99.2%.

Table 1.4

Results of Distillation in Final Step (kg)

| Components | First fraction | Second fraction | Third fraction | Residue |
|---|---|---|---|---|
| Antimony chlorides and antimony fluorides | 0.017 | 3.27 | 0.030 | 0.21 |
| | (0.056 moles) | (11.1 moles) | (0.10 moles) | (0.78 moles) |
| (Weight ratio of Sb(III)/total Sb) | (0.000) | (0.067) | (0.000) | (0.406) |
| (Atomic ratio of F/total Sb) | (0.002) | (0.002) | (0.001) | (0.047) |
| $CCl_4$ | 1.014 | 0.000 | 0.582 | 0.000 |
| $CCl_3F$ | 0.059 | 0.000 | 0.000 | 0.000 |
| $C_2Cl_6$ | 0.000 | 0.009 | 0.000 | 0.000 |
| $C_2Cl_5F$ | 0.006 | 0.012 | 0.017 | 0.000 |
| $C_2Cl_4F_2$ | 0.039 | 0.004 | 0.021 | 0.000 |
| $C_2Cl_3F_3$ | 0.427 | 0.000 | 0.005 | 0.000 |
| Other substances (inorganic salts other than those of Sb, tars, etc.) | 0.000 | 0.000 | 0.000 | 0.19 |
| Total | 1.562 | 3.295 | 0.655 | 0.40 |

EXAMPLE 2

From 11.5 kg of a spent antimony catalyst mixture, as shown in Table 2.1, obtained by heating in a 10 l vessel made of Hastelloy C (product of Haynes Stellite Co.) under normal pressure at 130° C to remove substances with low boiling points, antimony pentachloride was recovered.

Table 2.1

Composition of Spent Antimony Catalyst Mixture

| Components | Weight Composition (kg) |
|---|---|
| Antimony chlorides and antimony fluorides (Weight ratio of Sb(III)/total Sb = 0.145 and atomic ratio of F/total Sb = 0.834) | 6.4 (23.3 moles) |
| $C_2Cl_6$ | 0.19 |
| $C_2Cl_6F$ | 1.60 |
| $C_2Cl_4F_2$ | 2.51 |
| $C_2Cl_3F_3$ | 0.68 |
| Other substances (inorganic salts other than those of Sb, tars, etc.) | 0.12 |
| Total | 11.5 |

Trichlorotrifluoroethane was bubbled through the spent antimony catalyst mixture under atmospheric pressure at 130° C for 20 hours at a rate of 340 g/hr. and the discharged gas was collected by a water-cooled trap. As a result, the material entrained in and discharged with the trichlorotrifluoroethane had the composition shown in Table 2.2 The residue in the reaction vessel had a composition as shown in Table 2.3.

Table 2.2

Discharged Materials Entrained in Trichlorotrifluoroethane

| Components | Weight Composition (kg) |
|---|---|
| Antimony chlorides and antimony fluorides (Weight ratio of Sb(III)/total Sb = 0.058 and atomic ratio of F/total Sb = 0.37) | 0.896 (3.1 moles) |
| $C_2Cl_6$ | 0.004 |
| $C_2Cl_5F$ | 0.117 |
| $C_2Cl_4F_2$ | 1.12 |

Table 2.3

Composition of Residue Obtained after Bubbling of Trichlorotrifluoroethane

| Components | Weight Composition (kg) |
|---|---|
| Antimony chlorides and antimony fluorides (Weight ratio of Sb(III)/total Sb = 0.252 and atomic ratio of F/total Sb = 0.69) | 5.45 (20.2 moles) |
| $C_2Cl_6$ | 0.00 |
| $C_2Cl_5F$ | 0.01 |
| $C_2Cl_4F_2$ | 0.07 |
| $C_2Cl_3F_3$ | 0.08 |
| Other substances (inorganic salts other than those of Sb, tars, etc.) | 0.12 |
| Total | 5.73 |

To the residue was added 3 kg of carbon tetrachloride, followed by refluxing at 100° C for 5 hours (cooling temperature 25° C). During the refluxing, the gas discharged from the top of the reflux column was 1,060 g, with a composition of, by weight, 10.3% of carbon tetrachloride, 2.1% of trichloro trifluoroethane, 77.9% of trichlorofluoromethane, 8.2% of dichlorofluoromethane and 1.5% of phosgene. After cooling, 600 g of chlorine gas was added to the mixture at 25° C. Then, the mixture was subjected to single-stage distillation at 130° C under atmospheric pressure so as to expel carbon tetrachloride and the chlorinated hydrocarbons formed from carbon tetrachloride, thereby obtaining a distillate (hereinlater referred to as first fraction). Antimony pentachloride was successively distilled off at 90° C under 20 mmHg and the distillate was collected in a series of a water-cooled trap and an acetone-dry ice-cooled trap (hereinlater referred to as second fraction and third fraction, respectively). The results are as shown in Table 2.4 below. The recovery percentage of antimony in the second fraction was found to be 82.0 with a purity of about 100%.

The expelled materials collected in the water-cooled trap were distilled at 49° – 110° C under atmospheric pressure to leave an antimony mixture having approximately the same composition as shown in Table 2.2 but having a $C_2Cl_4F_2$ content of 0.052 kg. Purification of the third fraction was also effected by distilling off $CCl_4$, $CCl_3F$, $C_2Cl_4F_2$ and $C_2Cl_3F_3$ contained therein at 50° – 100° C under atmospheric pressure to leave another antimony mixture composed of about 0.03 kg of antimony compounds, 0.005 kg of $C_2Cl_5F$ and 0.003 kg of $C_2Cl_4F_2$. Each of the antimony mixtures thus obtained was found to be readily usable as catalyst for the preparation of trichlorotrifluoroethane from tetrachloroethylene by reaction with hydrogen fluoride.

Table 2.4
Results of Distillation in Final Step (kg)

| Components | First fraction | Second fraction | Third fraction | Residue |
|---|---|---|---|---|
| Antimony chlorides and antimony fluorides | 0.000 | 5.66 (19.1 moles) | 0.030 (0.1 moles) | 0.237 (0.87 moles) |
| (Sb(III)/total Sb weight ratio) | (0.038) | 0 | (0.35) | |
| (F/total Sb atomic ratio) | | (0.005) | 0 | (0.11) |
| $CCl_4$ | 0.171 | ⎫ | 0.567 | ⎫ |
| $CCl_3F$ | 0.187 | ⎪ | 0.062 | ⎪ |
| $C_2Cl_6$ | 0.000 | ⎬ 0.00 | 0.000 | ⎬ 0.00 |
| $C_2Cl_5F$ | 0.000 | ⎪ | 0.005 | ⎪ |
| $C_2Cl_4F_2$ | 0.008 | ⎪ | 0.068 | ⎪ |
| $C_2Cl_3F_3$ | 0.021 | ⎭ | 0.006 | ⎭ |
| $Cl_2$ | 0.119 | 0.00 | 0.00 | 0.00 |
| Other substances | 0.0146 | 0.00 | 0.00 | 0.12 |
| Total | 0.520 | 5.66 | 0.740 | 0.357 |

EXAMPLE 3

436 g of a spent antimony catalyst mixture having the composition as shown in Table 3.1 was obtained by heating a used antimony catalyst in a 500 ml stainless steel vessel under atmospheric pressure at 120° C to expel part of substances with low boiling points. Antimony pentachloride was recovered from the thus obtained mixture.

Table 3.1
Composition of Spent Antimony Catalyst Mixture

| Components | Weight Composition (g) |
|---|---|
| Antimony chlorides and antimony fluorides (Weight ratio of Sb(III)/total Sb = 0.102 and atomic ratio of F/total Sb = 0.56) | 246 (0.87 moles) |
| $C_2Cl_6$ | 7.0 |
| $C_2Cl_5F$ | 42.2 |
| $C_2Cl_4F_2$ | 110.1 |
| $C_2Cl_3F_3$ | 27.4 |
| $C_2Cl_4$ | 0.6 |
| Other substances (inorganic salts other than those of Sb, tars, etc.) | 4.9 |
| Total | 436 |

Nitrogen gas was bubbled through the spent antimony catalyst composition at 120° C under atmospheric pressure for 15 hours at a rate of 30 l/hr. (1 atm., 25° C). The discharged gas was collected by an acetone-dry ice trap. The materials entrained in and discharged with the nitrogen gas had a composition as shown in Table 3.2. The residue in the reaction vessel had a composition as shown in Table 3.3.

Table 3.2
Discharged Materials Entrained in Nitrogen Gas

| Components | Weight Composition (g) |
|---|---|
| Antimony chlorides and antimony fluorides (Weight ratio of Sb(III)/total Sb = 0.053 and atomic ratio of F/total Sb = 0.42) | 18.5 (0.06 moles) |
| $C_2Cl_6$ | 0.14 |
| $C_2Cl_5F$ | 10.8 |
| $C_2Cl_4F_2$ | 92.8 |
| $C_2Cl_3F_3$ | 26.9 |

Table 3.3
Composition of Residue Obtained after Bubbling of Nitrogen Gas

| Components | Weight Composition |
|---|---|
| Antimony chlorides and antimony fluorides (Weight ratio of Sb(III)/total Sb = 0.40 and atomic ratio of F/total Sb = 0.25) | 216.1 (0.81 moles) |
| $C_2Cl_6$ | ⎫ |
| $C_2Cl_5F$ | ⎪ |
| $C_2Cl_4F_2$ | ⎬ 0.00 |
| $C_2Cl_3F_3$ | ⎭ |
| Other substances (inorganic salts other than those of Sb, tars, etc.) | 4.9 |
| Total | 221.0 |

To the residue was added 100 ml of carbon tetrachloride, followed by refluxing at 90° C for 5 hours (cooling temperature of 25° C). 30 g of chlorine gas was added to the mixture at 25° C. Then, the mixture was subjected to single-stage distillation under atmospheric pressure at 130° C so as to expel carbon tetrachloride and the chlorofluorohydrocarbons formed from carbon tetrachloride, followed by distilling antimony pentachloride under 20 mmHg at 90° C and collecting in a water-cooled trap and an acetone-dry ice-cooled trap in series. The amount of the antimony pentachloride collected in the water cooled trap was 197.2 g (0.67 moles). An analysis thereof revealed weight ratio of Sb(III)/total Sb to be 0.051, atomic ratio of F/total Sb to be 0.002 and trace amount of organic compounds. The recovery percentage of antimony was 77.0% and purity about 100%.

EXAMPLE 4

Example 1 was repeated in the same manner as described except that 1500 ml of carbon tetrachloride and 256 g of chlorine were added to the residue obtained after the feeding of trichlorotrifluoroethane and the chlorination and oxidation reaction were conducted simultaneously at 100° C for 5 hours with refluxing. As a result, antimony pentachloride was obtained with approximately the same purity and yield as those in the Example 1.

EXAMPLE 5

Example 1 was further repeated in the same manner and conditions as described, but the oxidation by the reaction with chlorine was conducted prior to the chlorination with carbon tetrachloride. The purity and the yield of antimony were found to be comparable to those in the Example 1.

EXAMPLE 6

9.83 kg of a used antimony catalyst mixture consisting of 6.02 kg (21.1 moles) antimony halides (weight ratio of Sb (III)/total Sb = 0.22, atomic ratio of F/total Sb = 0.10), 3.53 kg of halogenated hydrocarbons ($CCl_4$, $CCl_3F$, $C_2Cl_6$, $C_2Cl_5F$, etc.) and 0.28 kg of the other substances (inorganic salts other than those of Sb, tars, etc.) were introduced into a 10 l vessel made of Hastelloy C and heated to 80° C, to which were added 850 g of hydrogen fluoride at a rate of 50 g/hr. at the same temperature under atmospheric pressure so as to substitute fluorine for the chlorine of the antimony halides, while recovering substances such as HCl, lower boiling point chlorofluorohydrocarbons and the like as overhead from the reaction vessel. As a result, atomic ratio of F/total Sb was increased to 1.10. The resultant catalyst mixture was then heated to 120° C to remove low boiling point substances under atmospheric pressure, thereby obtaining 7.52 kg of a spent antimony catalyst mixture having the composition shown in Table 6.1.

Table 6.1

| Composition of Spent Antimony Catalyst Mixture | |
|---|---|
| Components | Weight Composition (kg) |
| Antimony chlorides and antimony fluorides (weight ratio of Sb(III)/total Sb = 0.23 and atomic ratio of F/total Sb = 1.10 | 5.61 |
| Halogenated hydrocarbons | |
| $C_2Cl_6$ | 0.12 |
| $C_2Cl_5F$ | 0.50 |
| the others | 1.01 |
| Other substances (inorganic salts other than those of Sb, tars, etc.) | 0.28 |
| Total | 7.52 |

Then, trichlorotrifluoroethane was bubbled through the spent antimony catalyst mixture with the above composition at 110° C under atmospheric pressure for 42 hours in a rate of 200 g/hr., while continuously collecting the gas mixture discharged from the reaction vessel in a water-cooled trap. Every time a total of 2 kg of trichlorotrifluoroethane had been bubbled through the spent catalyst mixture, the overhead mixture thus collected was transferred into a rectification tower having 10 plates and trichlorotrifluoroethane was isolated at a steel temperature of 60° C under atmospheric pressure at a rate of 400 g/hr. The trichlorotrifluoroethane was found to contain 2 wt % of tetrachlorodifluoroethane. The thus recovered trichlorotrifluoroethane was reused as the inactive gas for the bubbling step. As a result, the residue in the reaction vessel had a composition as shown in Table 6.2.

Table 6.2

| Composition of Residue Obtained after Bubbling of Trichlorotrifluoroethane | |
|---|---|
| Components | Weight Composition (kg) |
| Antimony chlorides and antimony fluorides (weight ratio of Sb(III)/total Sb = 0.28 and atomic ratio of F/total Sb = 0.94) | 5.27 |
| Halogenated hydrocarbons | |
| $C_2Cl_6$ | 0.007 |
| $C_2Cl_5F$ | 0.024 |
| The others | 0.103 |
| Other substances (inorganic salts other than those of Sb, tars, etc.) | 0.28 |
| Total | 5.68 |

To the residue was added 5 kg of carbon tetrachloride, followed by refluxing at 100° C for 5 hours (cooling temperature of 25° C). After cooling, 400 g of chlorine gas was added to the mixture at 25° C. Then, the mixture was subjected to single-stage distillation under atmospheric pressure at 130° C so as to expel carbon tetrachloride and the chlorofluorohydrocarbons produced from carbon tetrachloride, followed by distilling the antimony pentachloride and the other substances in the residue under 20 mmHg at 90° C and collecting the distillate in a water-cooled trap and an acetone-dry ice-cooled trap, in series. The amount of the antimony pentachloride collected in the water-cooled trap was 5.41 kg (18.2 moles). An analysis thereof revealed the weight ratio of Sb(III)/total Sb to be 0.05, the atomic ratio of F/total Sb to be 0.003 and revealed trace amounts of organic compounds. The recovery percentage of antimony was 85.2% and purity about 100%.

As will be understood from the above examples, antimony pentachloride can be simply recovered in a high yield and a high purity according to the process of the invention. In addition to the second fraction, the discharged materials entrained in the inactive gas, the third fraction and, if desired, the first fraction can be utilized after separation, for example, by distillation. Each of the antimony mixtures obtained from these solutions can be used as catalyst as is, or can be returned to the first inactive gas-bubbling stage or the subsequent chlorination or oxidation stage. Further, from the residue of the final distillation step, antimony compounds may be recovered by any known method. Since, in the process of the present invention, handling of solid matters is not necessary except for withdrawal of the final residue, a mass transfer is feasible through pipes. Moreover, no special distillation column is required in the distillation steps. These make it possible to conduct the process of the present invention with simple apparatus.

We claim:

1. A process for the recovery of antimony pentachloride from a spent liquid catalyst mixture of antimony halides comprising antimony (III) and antimony (V) - halides and halogenated hydrocarbons having high melting points or high sublimation points, said process comprising the steps of:
   a. bubbling an inactive gas through the spent liquid antimony catalyst mixture at a temperature sufficient to convert the high melting point or high sublimation point halogenated hydrocarbons into lower boiling point chlorofluorohydrocarbons and to distill off, with the inactive gas, the lower boiling point chlorofluorohydrocarbons from the spent antimony catalyst mixture to form a first residue, wherein the fluorine content of said antimony halides is at least 0.2 gram-atoms per gram atom of total antimony during step (a); then
   b. reacting said first residue with a chlorinating agent to convert antimony fluorides into antimony chlorides, and with chlorine to convert trivalent antimony into pentavalent antimony; and
   c. distilling the treated catalyst mixture obtained in step (b) to recover antimony pentachloride as the distillate.

2. The process according to claim 1, wherein said inactive gas, at a temperature of between 80° and 140° C, does not substantially react with fluorinated antimony.

3. The process according to claim 2, wherein said inactive gas does not react with fluorinated antimony at all and is selected from the group consisting of helium, argon, nitrogen, carbon dioxide and sulfuryl fluoride.

4. The process according to claim 1, wherein pentavalent antimony is present in an amount at least 40% based on the weight of total antimony during step (a).

5. The process according to claim 4, wherein pentavalent antimony is present in an amount of 40 to 97% based on the weight of the total antimony during step (a).

6. The process according to claim 1, wherein antimony pentachloride is recovered by distillation at 100° to 130° C under atmospheric pressure followed by distillation at below 140° C under reduced pressure.

7. The process according to claim 6, wherein the distillation is conducted in chlorine gas atmosphere.

8. The process according to claim 1, wherein step (a) is carried out at a temperature of between 80 and 140° C.

9. The process according to claim 1, wherein step (a) is carried out under a pressure of between 0.5 and 5 atms./abs.

10. The process according to claim 1, wherein said inactive gas is fed at a rate from about 2 l/hr., at reaction temperature and pressure, per 1 kg of the spent catalyst mixture.

11. The process according to claim 1, wherein said inactive gas is trichlorotrifluoroethane, dichloromethane, dichlorotrifluoroethane or nitrogen.

12. The process according to claim 1, further comprising adding hydrogen fluoride to the spent antimony catalyst mixture so as to maintain at least 0.2 gram-atoms of fluorine bonded to antimony per gram-atom of total antimony during step (a).

13. The process according to claim 1, wherein step a is carried out for a period of time sufficient to reduce the amount of pentachlorofluoroethane and hexachloroethane in the catalyst mixture to at most 0.02 moles and 0.005 moles, respectively, per gram-atom of the total antimony contained therein.

14. The process according to claim 1, wherein said chlorinating agent is selected from the group consisting of carbon tetrachloride, chloroform, trichlorofluoromethane and boron trichloride.

15. The process according to claim 1, wherein said conversion of antimony fluorides into antimony chlorides by means of the chlorinating agent is carried out at a temperature of between 40° and 140° C under a pressure of between 0.5 and 8 atms./abs.

16. The process according to claim 1, wherein said conversion of trivalent antimony to pentavalent antimony by means of chlorine is carried out at a temperature of between 20° and 120° C under a pressure of between 0.5 and 3 atms./abs.

17. The process according to claim 1, wherein said chlorination and said oxidation are conducted simultaneously.

18. The process according to claim 1, wherein said chlorination is conducted either before or after said oxidation.

19. The process according to claim 1, further comprising recovering said inactive gas for recycling.

20. The process according to claim 1, wherein said spent antimony halides catalyst mixture has been used in the fluorination of chlorinated hydrocarbons having 1 or 2 carbons with hydrogen fluoride.

21. The process of claim 2 wherein said inactive gas is selected from the group consisting of trichlorotrifluoroethane, dichlorotetrafluoroethane, chloropentafluoroethane, dichloromethane, monochloromethane, dichlorotrifluoroethane, chlorotrifluoroethane, dichlorodifluorethane, chlorodifluoromethane, trifluoromethane, chlorotrifluoromethane, dichlorodifluoromethane, nitrogen trifluoride and perfluoroethyl ether.

* * * * *

UNITED STATES PATENT AND TRADEMARK OFFICE
CERTIFICATE OF CORRECTION

PATENT NO. : 4,070,439
DATED : January 24, 1978
INVENTOR(S) : OSAKA ET AL

It is certified that error appears in the above-identified patent and that said Letters Patent are hereby corrected as shown below:

Column 2, line 21, change "diserably" to --desirably--;
         line 57, change "pentrachlorde" to --pentachloride--

Column 3, line 2, change "provide" to --provides--;

line 48, change "10" (first occurrence) to --90--.

Column 5, line 31, change "piper" to --pipes--;
         line 55, change "along" to --a long--.

Column 9, line 24, change "moles" to --moles)--.

Column 11, line 10, delete "(0.038)" under column marked "First Fraction" and insert --"(0.038)" in column marked "Second fraction";

line 10, delete "0" under column marked "Second fraction" and insert "0" under column marked "Third fraction";

line 10, delete "(0.35)" under column marked "Third fraction" and insert --(0.35)-- in column marked "Residue".

UNITED STATES PATENT AND TRADEMARK OFFICE
CERTIFICATE OF CORRECTION

PATENT NO. : 4,070,439

DATED : January 24, 1978

INVENTOR(S) : OSAKA ET AL

It is certified that error appears in the above—identified patent and that said Letters Patent are hereby corrected as shown below:

Column 14, line 20, after "These" insert --features--.

Signed and Sealed this

Fifth Day of September 1978

[SEAL]

Attest:

RUTH C. MASON
*Attesting Officer*

DONALD W. BANNER
*Commissioner of Patents and Trademarks*